(12) United States Patent
Lord et al.

(10) Patent No.: US 6,640,898 B2
(45) Date of Patent: Nov. 4, 2003

(54) HIGH TEMPERATURE SEAWATER-BASED CROSS-LINKED FRACTURING FLUIDS AND METHODS

(75) Inventors: Paul D. Lord, Duncan, OK (US); John Terracina, Duncan, OK (US); Billy Slabaugh, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 46 days.

(21) Appl. No.: 10/107,888

(22) Filed: Mar. 26, 2002

(65) Prior Publication Data

US 2003/0183389 A1 Oct. 2, 2003

(51) Int. Cl.$^7$ ............................................. E21B 43/267
(52) U.S. Cl. ...................... 166/300; 166/308; 507/211; 507/215; 507/217; 507/260; 507/903
(58) Field of Search ................................ 166/300, 308; 507/211, 215, 217, 260, 903, 921, 922

(56) References Cited

U.S. PATENT DOCUMENTS

| | | | |
|---|---|---|---|
| 3,888,312 A | | 6/1975 | Tiner et al. |
| 4,462,917 A | | 7/1984 | Conway |
| 4,609,479 A | | 9/1986 | Smeltz |
| 5,304,620 A | * | 4/1994 | Holtmyer et al. ............ 527/310 |
| 5,335,733 A | * | 8/1994 | Sandiford et al. .......... 166/300 |
| 5,759,964 A | | 6/1998 | Shuchart et al. |
| 5,762,141 A | * | 6/1998 | Hutchins et al. ............ 166/295 |
| 5,827,804 A | | 10/1998 | Harris et al. |
| 6,227,295 B1 | | 5/2001 | Mitchell et al. |
| 6,488,091 B1 | * | 12/2002 | Weaver et al. .............. 166/300 |

OTHER PUBLICATIONS

G.T. Blair and M.F. Zienty, "Citric Acid Chelation," *Citric Acid: Properties and Reactions*, 1975, p. 71, Industrial Marketing Dept., Citrotech Division, Miles Laboratories, Inc. Elkhart, Indiana.

J.C. Kotz and K.F. Purcell, "Naming Coordination Compounds," *Chemistry & Chemical Reactivity*, 1987, p. 962 Saunders College Publishing, Philadelphia, PA.

A.S. de Kruijf, L.P. Roodhart and D.R. Davies, Relation Between Chemistry and Flow Mechanics of Borate–Crosslinked Fracturing Fluids, Aug. 1993, p. 165, SPEPF.

H. Le and R. Wood, New Frac Fluid Enhances Options for Offshore Wells, *Ocean Industry*, Mar. 1992, p. 49.

P.C. Harris and D. Van Batenburg, A Comparison of Freshwater– and Seawater–Based Borate–Crosslinked Fracturing Fluids, Feb. 16–19, 1999, SPE 50777, 1999 International Symposium on Oilfield Chemistry, Houston, Texas.

\* cited by examiner

*Primary Examiner*—George Suchfield
(74) *Attorney, Agent, or Firm*—Robert A. Kent; C. Clark Dougherty, Jr.

(57) ABSTRACT

The present invention provides seawater-based cross-linked fracturing fluids and methods of preparing and using the fluids in fracturing subterranean formations penetrated by well bores and having temperatures above about 200° F. The improved cross-linked fracturing fluids are basically comprised of a gelling agent, seawater present in an amount sufficient to hydrate the gelling agent and to form a gelled aqueous fluid, and a delayed cross-linking agent, capable of causing delayed cross-linking of the gelling agent in the gelled aqueous fluid at a pH below the threshold for precipitate formation in seawater.

16 Claims, No Drawings

HIGH TEMPERATURE SEAWATER-BASED CROSS-LINKED FRACTURING FLUIDS AND METHODS

BACKGROUND OF THE INVENTION

1. Field of the Invention

The present invention relates to seawater-based delayed cross-linking fracturing fluids and methods of using the fluids in fracturing subterranean formations penetrated by well bores.

2. Description of the Prior Art

Oil and gas wells often undergo hydraulic fracturing operations to increase the flow of oil and natural gas from subterranean formations. Hydraulic fracturing is accomplished by injecting a viscous fracturing fluid through the well bore into a subterranean formation to be fractured and applying sufficient fluid pressure on the formation to cause the production of one or more fractures therein. In offshore operations, the fracturing fluid can be prepared utilizing seawater to hydrate a gelling agent to form a viscous aqueous fluid. To promote adequate viscosity at increased well depths, cross-linking agents such as borate ion releasing compounds can be incorporated into the fracturing fluids.

Seawater-based borate cross-linked fracturing fluids perform satisfactorily in low temperature fracturing applications, typically about 200° F. or less. At these lower temperatures, the initial pH required to form a sufficiently cross-linked gel is about 9.5 or less. In general, a sufficiently cross-linked gel is defined as having a viscosity of about 200 centipoises or greater at 40/sec shear rate. In order to form a sufficiently cross-linked gel for use at formation temperatures in excess of 200° F., the initial pH of a borate cross-linked fracturing fluid must be greater than about 9.5. Elevation of the fracturing fluid pH to a level in excess of 9.5, however, poses several operational problems. For instance, seawater contains multivalent ions such as calcium and magnesium ions which form insoluble precipitates at a pH greater than about 9.5. The presence of solid precipitates reduces the proppant pack conductivity, and ultimately the productivity of the fracturing operation.

Furthermore, elevating the pH of the fracturing fluid to a pH greater than about 9.5 is difficult due to the formation of magnesium hydroxide. Hydroxyl ions needed to elevate the pH of the seawater are instead consumed in the formation of magnesium hydroxide. This reaction proceeds very slowly causing the pH change to be time-delayed and difficult to adjust. In addressing the problems associated with precipitate formation in high-temperature seawater-based fracturing fluids, prior art methods suggest the removal of solid precipitates by filtration. However, the proper disposal of magnesium hydroxide and other precipitates creates additional operational costs as well as environmental challenges.

In order to conduct fracturing operations at greater well depths, it is desirable to delay cross-linking of the fracturing fluid. In particular, a delayed cross-link is advantageous in the fracturing of offshore formations where such operations are usually performed at lower injection rates because of pumping equipment limitations. Reduced injection rates, typically about 10 barrels/minute or less, lead to increased pipe times. Pipe time refers to the time required for the fracturing fluid to make the transit from surface pumping equipment to the formation to be fractured. It is generally desirable to have cross-linking occur near the end of the pipe time as the fluid approaches the formation to be fractured. If cross-linking occurs too early, the increase in fracturing fluid viscosity will increase friction loss in the well bore and produce high pump pressures. To overcome these problems, the cross-linking of the fracturing fluid is delayed until the fluid approaches a location near or within the formation to be fractured.

For these reasons, there is a need for a seawater-based fracturing fluid that avoids precipitate formation and forms delayed cross-links in high temperature fracturing operations.

SUMMARY OF THE INVENTION

The present invention provides cross-linked fracturing fluids and methods of using the fluids to fracture subterranean formations which meet the needs described above and overcome the deficiencies of the prior art. The inventive fracturing fluids and methods are particularly useful for use in connection with offshore oil and gas wells. For example, the fluids are stable at temperatures above 200° F. and are fully functional at pH levels below the threshold for precipitate formation in seawater, e.g., at a pH of 9.5 or less. Even though the fluids are seawater based, cross-linking can be delayed and controlled in order to facilitate injection of the fluid and other aspects of the fracturing operation.

In one embodiment, the inventive composition is a high temperature delayed cross-linked fracturing fluid comprising:

a gelling agent;

seawater, present in at least an amount sufficient to hydrate the gelling agent, thereby forming a gelled aqueous fluid; and a cross-linking agent, capable of causing delayed cross-linking of the gelling agent at a pH of about 9.5 or less, whereby the delay in cross-linking is about 5 minutes or more.

In another embodiment, the inventive composition is a high temperature delayed cross-linked fracturing fluid comprising:

a gelling agent;

seawater, present in at least an amount sufficient to hydrate said gelling agent, thereby forming a gelled aqueous fluid; and a cross-linking agent capable of causing delayed cross-linking of the gelling agent at a pH of about 9.5 or less, said cross-linking agent being selected from the group consisting of ammonium titanyl citrate, ammonium titanyl tartarate, ammonium titanyl gluconate, and mixtures thereof.

In yet another embodiment, the inventive composition is a high temperature delayed cross-linked fracturing fluid comprising:

a gelling agent; and seawater, present in at least an amount sufficient to hydrate the gelling agent, thereby forming a gelled aqueous fluid; and a cross-linking agent capable of causing delayed cross-linking of the gelling agent at a pH of about 9.5 or less, said cross-linking agent being ammonium titanyl citrate.

In one embodiment, the inventive method of fracturing a subterranean formation penetrated by a well bore and having a temperature above about 200° F. basically comprises the following steps:

(a) preparing a seawater-based delayed cross-linked fracturing fluid comprising a gelling agent; seawater present in at least an amount sufficient to hydrate the gelling agent, thereby forming a gelled aqueous fluid; and a delayed cross-linking agent capable of causing delayed cross-linking of the gelling agent at a pH of about 9.5 or less, whereby the delay in the cross-linking is about 5 minutes or more; and (b) introducing said fracturing fluid into a subterranean formation at a rate and pressure whereby fractures are formed in the subterranean formation.

In addition to fracturing subterranean formations, the inventive fracturing fluids are useful in connection with other operations as well. For example, the fluids can be used in combination fracturing/gravel packing operations.

DESCRIPTION OF THE PREFERRED EMBODIMENTS

A primary advantage of the cross-linked fracturing fluids of the instant invention is that the fluids can be prepared with seawater pumped from the ocean at the site of the fracturing operation, wherever the job happens to be. As a result, the present compositions are inexpensive and simple to prepare, using either batch mixing or on-the-fly procedures.

Another primary advantage is that the inventive cross-linked fracturing fluids are stable at temperatures above about 200°F. and at a pH of about 9.5 or less. Due to the lower pH, the fluids are compatible with enzyme breakers, and calcium and magnesium salts remain in solution. Even where the gelling agent has been hydrated with seawater, the fracturing fluid provides a delay in cross-linking, conducive to fracturing subterranean formations at greater depths and/or with lower injection rates. Thus, the fracturing fluid has an initial viscosity that is high enough to transport proppant but is not so high as to make pumping difficult.

In general, the cross-linked fracturing fluids of the present invention comprise a gelling agent; seawater present in at least an amount sufficient to hydrate the gelling agent, thereby forming a gelled aqueous fluid; and a cross-linking agent capable of causing delayed cross-linking of said gelling agent at a pH of less than the threshold for precipitate formation in seawater e.g., at a pH of 9.5 or less.

Suitable gelling agents include galactomannan gums, modified or derivative galactomannan gums, and cellulose derivatives. Additional examples of gelling agents which may be utilized in the present invention include but are not limited to guar, hydroxypropylguar, carboxymethylhydroxypropylguar, carboxymethylguar, caboxymethylcellulose, carboxymethylhydroxyethylcellulose, and mixtures thereof. Preferred gelling agents include guar and hydroxypropyl guar. Other natural or synthetic polymers which are known in the art but which are not specifically mentioned herein can also be utilized.

The gelling agent is present in the fracturing fluid in an amount in the range of from about 15 to about 60 pounds per 1000 gallons of seawater, preferably from about 20 to about 45 pounds per 1000 gallons of seawater, and most preferably from about 25 to about 35 pounds per 1000 gallons of seawater. Seawater is present in the fracturing fluid in at least an amount sufficient to hydrate the gelling agent.

The cross-linking agent utilized in the present invention is capable of causing delayed cross-linking of the gelling agent for pipe transit times greater than 5 minutes. Thus, the delay in cross-linking exhibited by compositions of the present invention is about 5 minutes or more. Suitable delayed cross-linking agents include but are not limited to ammonium titanyl citrate, ammonium titanyl tartarate, ammonium titanyl gluconate, and mixtures thereof. Of these, ammonium titanyl citrate, the coordination compound ammonium dicitratotitanate, is preferred. The delayed cross-linking agent utilized is in the form of a concentrate having a concentration equivalent to 5.6% $TiO_2$. The delayed cross-linking agent is generally combined with the gelled aqueous fluid in an amount sufficient to provide a titanium concentration in the range of from about 0.45 to about 1.8 percent by weight of said gelling agent.

Propping agents may also be added to the fracturing fluids of the instant invention to hold the fractures open after the fracturing fluid flows back into the well. In general, proppants must have sufficient compressive strength to resist crushing but also must be sufficiently non-abrasive and non-angular to preclude cutting and imbedding into the formation. Examples of suitable proppants include but are not limited to sand, graded gravel, glass beads, sintered bauxite, resin coated sintered bauxite, resin coated sand, ceramics, and resin coated ceramics. Proppants may be present in the inventive composition in an amount in the range of from about 0 to about 25 pounds per gallon, preferably in an amount in the range of from about 0.5 to about 18 pounds per gallon, and most preferably in an amount in the range of from about 0.5 to about 12 pounds per gallon.

The fracturing fluids of the present invention can also comprise a gel breaker which "breaks" or diminishes the viscosity of the fracturing fluid so that it is more easily recovered from the fracture during clean up. Examples of breakers suitable for use with the inventive fracturing fluids include oxidizing agents, enzymes, and acids, with oxidizing agents being the most preferred. The gel breaker is generally present in the fracturing fluid in an amount in the range of from about 0 to about 20 pounds per 1000 gallons, preferably in the range of from about 5 to about 15 pounds per 1000 gallons of seawater, and most preferably in the range of from 5 about 5 to about 10 pounds per 1000 gallons of seawater.

A preferred embodiment of the inventive cross-linking fracturing fluid of the invention comprises a seawater-based solution of hydroxypropyl guar and ammonium titanyl citrate.

The fracturing fluid can include a variety of other conventional additives such as gel stabilizers, clay stabilizers, bactericides, fluid loss additives and the like which do not adversely react with the fracturing fluids or prevent their loss in a desired manner.

The cross-linked fracturing fluids of the instant invention can be prepared by dissolving a gelling agent in seawater to form a gelled aqueous fluid, and then combining with the gelled aqueous fluid a delayed cross-linking agent, capable of causing delayed cross-linking of the gelling agent at a pH of about 9.5 or less. The gelling agent is added to seawater as either a solid or a liquid gel concentrate in a pre-hydrated or slurried form using conventional mixing and pumping equipment. Thereafter, the delayed cross-linking composition is combined with the gelled aqueous fluid. As is understood by those skilled in the art, the cross-linker may be pumped and metered into the gelled aqueous fluid as the gelled aqueous fluid is pumped into the well bore.

The present invention also provides for a method of fracturing a subterranean formation penetrated by a well bore and having a temperature above about 200° F., comprising the steps of (a) preparing a delayed cross-linked fracturing fluid comprising a gelling agent, seawater, present in an amount sufficient to hydrate said gelling agent, thereby forming a gelled aqueous fluid; and a delayed cross-linking agent, capable of causing delayed cross-linking of the gelling agent at a pH of 9.5 or less; and (b) introducing the fracturing fluid into a subterranean formation at a rate and pressure whereby fractures are formed in the subterranean formation.

Another method of fracturing subterranean formations with a temperature of more than about 200° F. comprises the following steps: (a) preparing a delayed cross-linked fracturing fluid comprising gelling agent; seawater; and a delayed cross-linking agent, said cross-linking agent being selected from the group consisting of ammonium titanyl citrate, ammonium titanyl tartarate, ammonium titanyl gluconate, and mixtures thereof; and (b) introducing said fracturing fluid into a subterranean formation at a rate and pressure whereby fractures are formed in the subterranean formation. The fracturing fluid of the present invention is particularly useful in combination fracturing/gravel packing operations.

In order to further illustrate the compositions and methods of the present invention, the following examples are given.

EXAMPLE 1

A gel comprising 35 ppt hydroxypropyl guar ("HPG") in seawater and cross-linked with ammonium titanyl citrate ("ATC") was prepared as Sample 1 and evaluated for use as a fracturing fluid at a temperature of about 250° F. (121° C.). Seawater was added in an amount of about 562.5 ml to a blender jar. With moderate agitation, 437.5 ml of an 80 ppt HPG gel concentrate with a pH of about 10.5 was added to produce a 35 ppt HPG gel (the "HPG gel"). A gel stabilizer, 0.6 grams of sodium thiosulfate, was added to the blender jar. After 2 minutes of agitation, the pH of the HPG gel was about 9.25. Since the HPG in the 80 ppt concentrate was fully hydrated, additional time for gel hydration was not required. With good agitation, 1.0 ml of ATC cross-linking agent solution (5.35% by weight $TiO_2$) was added to the HPG gel and allowed to mix for a time of about 30 seconds.

A 35 ml aliquot of the cross-linked gel (the "fluid sample") was transferred immediately to the R1 rotor cup of a Fann Model 50C viscometer. The rotor cup containing the fluid sample was attached to the viscometer equipped with a B5X bob. The fluid sample was pressurized to 350 psi and immersed in the preheated bath on the viscometer. The rotor cup was set in motion at 118 rpm providing a shear rate of 100 $sec^{-1}$ on the fluid sample. The viscometer was programmed to maintain a constant 100 $sec^{-1}$ shear rate on the fluid sample, except when performing a shear rate sweep. A shear rate sweep of 100, 75, 50, 25, 50, 75, and 100 $sec^{-1}$ was programmed to occur every 15 minutes after the fluid sample reached a temperature of about 250° F. The shear stress at each shear rate was recorded. Power-law indices, n' and K', were calculated from the shear stress versus shear rate values. These indices are defined in the American Petroleum Institute's (API) publication RP39, $3^{rd}$ Edition, Section 6. The results of these calculations and the apparent viscosity of Sample 1 at each shear rate are shown in Table 1.

Generally, fluids with a viscosity greater than 200 centipoises at 40 $sec^{-1}$ are thought to be adequate for fracturing operations. The stability of a fracturing fluid is defined in terms of its ability to maintain an adequate viscosity for an extended period of time at a given temperature. Referring to Table 1, the data show that the seawater fracturing fluid formulated by cross-linking a 35 ppt HPG solution with ATC has a viscosity greater than 300 centipoises at 40 $sec^{-1}$ after 2 hours at a temperature of about 250° F. Thus, the data illustrate that the seawater-based cross-linked fracturing fluids of the present invention are stable over prolonged periods of time at temperatures exceeding 200° F.

TABLE 1

| Elapsed Time (min.) | Sample Temperature (° F.) | Power Law Index n' | Power Law Index K' | Apparent Viscosity (centipoises) at 40/sec. | Apparent Viscosity (centipoises) at 70/sec. |
|---|---|---|---|---|---|
| 0 | 77 | 0.452 | 0.0220 | 140 | 63 |
| 3.37 | 147 | 0.338 | 0.0827 | 344 | 132 |
| 13.42 | 246 | 0.722 | 0.0310 | 532 | 356 |
| 23.38 | 248 | 0.690 | 0.0359 | 548 | 350 |
| 33.38 | 247 | 0.685 | 0.0351 | 525 | 333 |
| 43.38 | 248 | 0.677 | 0.0343 | 498 | 312 |
| 53.38 | 248 | 0.675 | 0.0327 | 472 | 295 |
| 63.42 | 248 | 0.690 | 0.0289 | 440 | 281 |
| 73.42 | 248 | 0.695 | 0.0275 | 427 | 275 |
| 83.38 | 248 | 0.688 | 0.0271 | 409 | 260 |
| 93.38 | 248 | 0.694 | 0.0249 | 386 | 248 |
| 103.38 | 248 | 0.696 | 0.0236 | 368 | 237 |
| 113.42 | 248 | 0.704 | 0.0218 | 350 | 228 |
| 123.38 | 248 | 0.703 | 0.0210 | 336 | 219 |
| 132.47 | 248 | 0.691 | 0.0213 | 326 | 209 |

EXAMPLE 2

The experimental procedure described in Example 1 was used to formulate and evaluate comparative samples of seawater-based fracturing fluids prepared with commercially available delayed cross-linking additives. Identical test procedures and apparatus were used to provide a comparison to the performance of Sample 1. The comparative samples were prepared using the same methods and amounts of HPG, seawater, and gel stabilizer as in Sample 1. However, instead of the ATC cross-linking agent of the present invention, Sample 2 comprised a commercially available delayed cross-linker containing an organotitanate chelate and a polyhydroxyl-containing composition used for fracturing at temperatures above 200° F. The cross-linker utilized in Sample 2 is available from Halliburton Energy Services, Inc. under the trade designation "CL-18." Sample 3 comprised a borate-mineral slurry used as a delayed cross-linker for fracturing at temperatures above 200° F., which is commercially available from Halliburton Energy Services, Inc. under the trade designation "CL-28M."Table 2 provides the viscosities of Sample 1, Sample 2 and Sample 3 as determined at 40 $sec^{-1}$ shear rate over a 2-hour period at a temperature of about 250° F. Referring to Table 2, the data illustrate that the ATC cross-linked fluid provides superior viscosity and stability in comparison to the fluids cross-linked with commercially available delayed cross-linking agents. The data also show that the ATC cross-linked fluid of Sample 1 provides a much longer cross-link time than the CL-18 cross-linked fluid of Sample 2.

TABLE 2

| Sample 1 | | | Sample 2 | | | Sample 3 | | |
|---|---|---|---|---|---|---|---|---|
| Elapsed Time (min.) | Sample Temp (° F.) | Apparent Viscosity (centipoises) at 40/sec. | Elapsed Time (min.) | Sample Temp (° F.) | Apparent Viscosity (centipoises) at 40/sec. | Elapsed Time (min.) | Sample Temp (° F.) | Apparent Viscosity (centipoises) at 40/sec. |
| 0.00 | 76 | 139 | 0.00 | 78 | 119 | 0.00 | 83 | 394 |
| 3.37 | 147 | 344 | 3.40 | 148 | 350 | 3.37 | 169 | 924 |
| 13.42 | 245 | 532 | 13.38 | 245 | 245 | 13.42 | 241 | 455 |
| 23.38 | 248 | 548 | 23.38 | 250 | 242 | 23.38 | 245 | 322 |
| 33.38 | 248 | 525 | 33.38 | 248 | 233 | 33.38 | 246 | 324 |
| 43.38 | 248 | 498 | 43.42 | 248 | 217 | 43.38 | 247 | 293 |
| 53.38 | 248 | 472 | 53.38 | 248 | 197 | 53.38 | 247 | 243 |
| 63.42 | 248 | 440 | 63.38 | 248 | 183 | 63.42 | 247 | 193 |
| 73.42 | 248 | 427 | 73.42 | 248 | 171 | 73.42 | 247 | 187 |
| 83.38 | 248 | 409 | 83.42 | 248 | 157 | 83.38 | 247 | 151 |
| 93.38 | 248 | 386 | 93.42 | 248 | 148 | 93.38 | 247 | 126 |
| 103.38 | 248 | 368 | 103.42 | 248 | 142 | 103.38 | 247 | 112 |
| 113.42 | 248 | 350 | 113.38 | 248 | 136 | 113.42 | 247 | 97 |
| 123.38 | 248 | 336 | 112.47 | 248 | 131 | 123.38 | 247 | 90 |

EXAMPLE 3

Samples were prepared and evaluated which demonstrate that the fracturing fluids of the present invention exhibit longer cross-linking times than fluids utilizing other commercially available cross-linking agents. Sample 4, an ATC cross-linked fluid of the present invention, was prepared in accordance with the procedures utilized in preparing Sample 1. Sample 5, a comparative sample containing a delayed organotitanate cross-linker that is commercially available from Halliburton Energy Services, Inc. under the trade designation "CL-18," was prepared in accordance with the procedures utilized to prepare Sample 2. After the addition of the respective cross-linkers, Sample 4 and Sample 5 were heated to 100° F. in a water bath. Progress of the cross-linking reaction was monitored by timing the development of a lipping cross-link gel. Lipping behavior was visually observed by tilting the sample cup in a decanting motion. The samples were considered to be sufficiently cross-linked when they did not easily pour from the cup and exhibited recoil back into the cup after being extended over the edge.

The cross-link time of Sample 4, the ATC cross-linked fluid, was 10:00 minutes, whereas the cross-link time of Sample 5 was 3:11 minutes. The data show that, at well bore temperature of about 100° F., the delayed cross-linked fracturing fluid of the present invention exhibits a much greater cross-link time than fluids utilizing other commercially available delayed cross-linking additives.

Thus, the present invention is well adapted to carry out the objects and attain the benefits and advantages mentioned as well as those that are inherent therein. While numerous changes to the compositions and methods can be made by those skilled in the art, such changes are encompassed within the spirit of this invention as defined by the appended claims.

What is claimed is:

1. A method of fracturing a subterranean formation penetrated by an offshore well bore and having a temperature above about 200° F., comprising the steps of:
   (a) preparing a seawater-based delayed cross-linked fracturing fluid comprising:
      a gelling agent;
      seawater, present in an amount sufficient to hydrate said gelling agent, thereby forming a gelled aqueous fluid; and
      a delayed cross-linking agent capable of causing delayed cross-linking of said gelling agent at a pH of about 9.5 or less, whereby said delay is about 5 minutes or more; and
   (b) introducing said fracturing fluid into the subterranean formation at a rate and pressure whereby fractures are formed in the subterranean formation.

2. The method of claim 1, wherein said gelling agent is selected from the group consisting of guar, hydroxypropyl guar, carboxymethylhydroxypropylguar, carboxymethylguar, carboxymethylcellulose, carboxymethylhydroxyethylcellulose, and mixtures thereof.

3. The method of claim 1 wherein said gelling agent is hydroxypropyl guar.

4. The method of claim 1 wherein said gelling agent is present in an amount in the range of from about 15 to about 60 pounds per 1000 gallons of said seawater.

5. The method of claim 1 wherein said delayed cross-linking agent is selected from the group consisting of ammonium titanyl citrate, ammonium titanyl tartarate, ammonium titanyl gluconate, and mixtures thereof.

6. The method of claim 1 wherein said delayed cross-linking agent is ammonium titanyl citrate.

7. The method of claim 1 wherein said delayed cross-linking agent is present in an amount sufficient to provide a titanium concentration in the range of from about 0.45 to about 1.8 percent by weight of said gelling agent.

8. The method of claim 1 further comprising introducing a proppant into said fractures, said proppant being suspended in said fracturing fluid.

9. The method of claim 1 wherein said fracturing fluid further comprises a gel breaker selected from the group consisting of oxidizing agents, enzymes, and acids.

10. A method of fracturing a subterranean formation penetrated by a well bore and having a temperature above about 200° F., comprising the steps of:
   (a) preparing delayed cross-linked fracturing fluid comprising:
      a gelling agent;
      seawater present in an amount sufficient to hydrate said gelling agent; and
      a delayed cross-linking agent, said cross-linking agent being selected from the group consisting of ammo nium titanyl citrate, ammonium titanyl tartarate, ammonium titanyl gluconate, and mixtures thereof; and (b) introducing said fracturing fluid into the subterranean formation at a rate and pressure whereby fractures are formed in the subterranean formation.

11. The method of claim 10 wherein said gelling agent is selected from the group consisting of guar, hydroxypropyl guar, carboxymethylhydroxypropylguar, carboxymethylguar, carboxymethylcellulose, carboxymethylhydroxyethylcellulose, and mixtures thereof.

12. The method of claim 10 wherein said gelling agent is hydroxypropyl guar.

13. The method of claim 10 wherein said gelling agent is present in an amount in the range of from about 15 to about 60 pounds per 1000 gallons of said seawater.

14. The method of claim 10 wherein said delayed cross-linking agent is ammonium titanyl citrate.

15. The method of claim 10 wherein said delayed cross-linking agent is present in an amount sufficient to provide a titanium concentration in the range of from about 0.45 to about 1.8 percent by weight of said gelling agent.

16. The method of claim 10 wherein said fracturing fluid further comprises a gel breaker selected from the group consisting of oxidizing agents, enzymes, and acids.

* * * * *